(12) United States Patent  
Wang

(10) Patent No.: US 7,725,700 B2
(45) Date of Patent: May 25, 2010

(54) EMBEDDED SYSTEM, AUTOMATIC LOADING SYSTEM, AND METHOD CAPABLE OF AUTOMATICALLY LOADING A ROOT FILE SYSTEM

(75) Inventor: Keng-Chun Wang, Taipei Hsien (TW)

(73) Assignee: Lite-On Technology Corp., Taipei (TW)

( * ) Notice: Subject to any disclaimer, the term of this patent is extended or adjusted under 35 U.S.C. 154(b) by 1303 days.

(21) Appl. No.: 11/162,144

(22) Filed: Aug. 30, 2005

(65) Prior Publication Data

US 2006/0174099 A1 Aug. 3, 2006

(30) Foreign Application Priority Data

Jan. 28, 2005 (TW) .............................. 94102807 A

(51) Int. Cl.
*G06F 15/177* (2006.01)
(52) U.S. Cl. ....................................................... 713/1
(58) Field of Classification Search ...................... 713/1
See application file for complete search history.

(56) References Cited

U.S. PATENT DOCUMENTS

| 6,779,130 B2 * | 8/2004 | Sprunt et al. | 714/6 |
| 7,418,588 B2 * | 8/2008 | Lin et al. | 713/2 |
| 7,467,293 B2 * | 12/2008 | Zhang et al. | 713/1 |
| 2003/0046529 A1 | 3/2003 | Loison | |
| 2003/0191623 A1 * | 10/2003 | Salmonsen | 703/24 |

* cited by examiner

*Primary Examiner*—Thomas Lee
*Assistant Examiner*—Eric Chang
(74) *Attorney, Agent, or Firm*—Kile Goekjian Reed & McManus PLLC

(57) ABSTRACT

An embedded system, automatic loading system and method capable of automatically loading a root file system. The method includes turning on the embedded system to execute a boot code; utilizing the boot code for executing a kernel, utilizing the kernel for activating a root file system auto initial program to retrieve a root file system image file stored in an external device external to the embedded system, and loading the root file system according to the root file system image file.

18 Claims, 4 Drawing Sheets

EMBEDDED SYSTEM, AUTOMATIC LOADING SYSTEM, AND METHOD CAPABLE OF AUTOMATICALLY LOADING A ROOT FILE SYSTEM

BACKGROUND OF THE INVENTION

1. Field of the Invention

The present invention relates to a system and method capable of loading a root file system, and more particularly, to an embedded system, automatic loading system, and method capable of automatically loading a root file system.

2. Description of the Prior Art

Embedded systems and their related application devices are increasingly popular. Many devices both in production and in development utilize embedded systems, such as: information appliances (IA), smart phones, and set-top boxes. Embedded systems are typically composed of computer software (e.g., an embedded operating system) and computer hardware (e.g., system single chip). The embedded system is developed based on a specific purpose. Because of this narrow development goal, the embedding system, as compared with a typical personal computer, has advantages including: high stability, small volume, and low cost. Many products such as Palm OS, Windows CE, and Linux utilize embedded systems. The Linux operating system is especially popular because it is available as freeware.

The prior art embedded system downloads the root file system in a flash memory (e.g. a non-volatile memory) corresponding to an embedded operating system. Please refer to FIG. 1. FIG. 1 is a block diagram of a related art embedded system 10. The embedded system 10 comprises a microprocessor 12, a non-volatile memory 14, and a volatile memory 16, wherein the microprocessor 12 is utilized to control operation of the embedded system, the non-volatile memory 14 (e.g. flash memory or ROM) is utilized to record a boot code Boot_Code, a kernel Kernel and a root file system image file RFS. The volatile memory 16 (e.g. DRAM) is utilized to temporarily store program code and operation information required for an operation of the embedded system 10. The boot code Boot_Code is utilized to control the loading of the kernel Kernel. For example, the boot code Boot_Code is a boot loader, which can supply multi-boot to control booting process of the embedded system 10 to utilize the kernel Kernel to control hardware operation of the embedded system 10 by loading the proper kernel Kernel.

Please refer to FIG. 2. FIG. 2 shows a flowchart of loading the embedded system 10. The flowchart includes the following steps:

Step 100: Turn on the embedded system 10.

Step 105: The microprocessor 12 automatically loads the boot code Boot_Code that is stored in the non-volatile memory 14 to the volatile memory 16.

Step 110: The microprocessor 12 retrieves the boot code Boot_Code that is temporally stored in the volatile memory 16 to further execute the boot code Boot_Code to load the kernel Kernel stored in the non-volatile memory 14 to the volatile memory 16.

Step 120: The microprocessor 12 retrieves the kernel Kernel stored in the volatile memory 16 to further execute the kernel Kernel to configure the hardware of the embedded system 10.

Step 130: After the kernel Kernel finishes the configuration of the hardware of the embedded system 10, the microprocessor 12 executes the kernel Kernel to load the root file system image file RFS that is stored in the non-volatile memory 14 to the volatile memory 16.

Step 140: The microprocessor 12 decompresses the root file system image file RFS to generate the needed root file system.

As mentioned above, the embedded system 10 utilizes the non-volatile memory 14 to store the root file system image file RFS applied to the embedded system 10. However, due to cost considerations, the volume of the non-volatile memory 14 is limited. Therefore, the prior art mechanisms for loading the root file system have several defects, such as:

1. Due to the root file system image file RFS size limitation beginning governed by the size of the non-volatile memory 14, optimization of the application software of the root file system image file RFS is not possible.

2. Due to the size limitation of non-volatile memory 14, the embedded system 10 can only accommodate a single root file system image file RFS; and 3. The embedded system 10 can only utilize the root file system image file RFS stored in the non-volatile memory 14 (i.e., the user can not load other root file system image file). These defects make functionality expansion of the embedded system 10 difficult.

SUMMARY OF THE INVENTION

One objective of the claimed invention is therefore to provide an embedded system, automatic loading system and method of automatically loading the root file system, to solve the above-mentioned problems.

According to an exemplary embodiment of the claimed invention, a method capable of automatically loading a root file system to an embedded system is disclosed. The method comprises: turning on the embedded system to execute a boot code; utilizing the boot code to execute a kernel; utilizing the kernel to execute a root file system auto initial program to retrieve a root file system image file stored in an external device external to the embedded system; and loading the root file system into the embedded system according to the root file system image file.

According to another exemplary embodiment of the claimed invention, an embedded system is disclosed. The embedded system comprises: a microprocessor for controlling an operation of the embedded system; a first storage device coupled to the microprocessor; and a second storage device coupled to the microprocessor for storing a boot code, a kernel, and a root file system auto initial program. The microprocessor sequentially loads and executes the boot code, the kernel, and the root file system auto initial program from the second storage device, utilizes the kernel to load the root file system auto initial program to retrieve a root file system image file stored in an external device external to the embedded system, and loads a root file system into the first storage device according to the root file system image file.

According to another exemplary embodiment of the claimed invention, an automatic loading system of a root file system is disclosed. The automatic loading system comprises: a microprocessor for controlling an operation of the embedded system; a first storage device coupled to the microprocessor; and a second storage device coupled to the microprocessor for storing a boot code, a kernel, and a root file system auto initial program; and an external device external to the embedded system for storing a root file system image file. The microprocessor sequentially loads and executes from the second storage device the boot code, the kernel, and the root file system auto initial program. Next the microprocessor utilizes the kernel to load the root file system auto initial program to retrieve the root file system image file stored in the external device external the embedded system, and loads the root file system into the first storage device according to the root file system image file.

The present invention utilizes an external device to provide a larger volume for the storage of the root file system image file. This increases the size of the volatile memory providing sufficient space to store and execute the root file system image file. In other words, the volume of the root file system image file it no longer limited to the volume of the non-volatile memory. Therefore the root file system image file can be optimized and comprises more application programs to make diversity of the embedded system. Additionally, the present invention can load the root file system image file from outside making the embedded system to execute the needed root file system. As a result, there is great flexibility when utilizing embedded systems. Additionally, the present invention loads the root file system auto initial program before application programs load. This allows the present invention to control the booting process and the loading of the root file system image file. Therefore, the present invention can easily be applied to various kinds of embedded systems. In other words, the present invention loading root file system image file is easily to be implemented.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
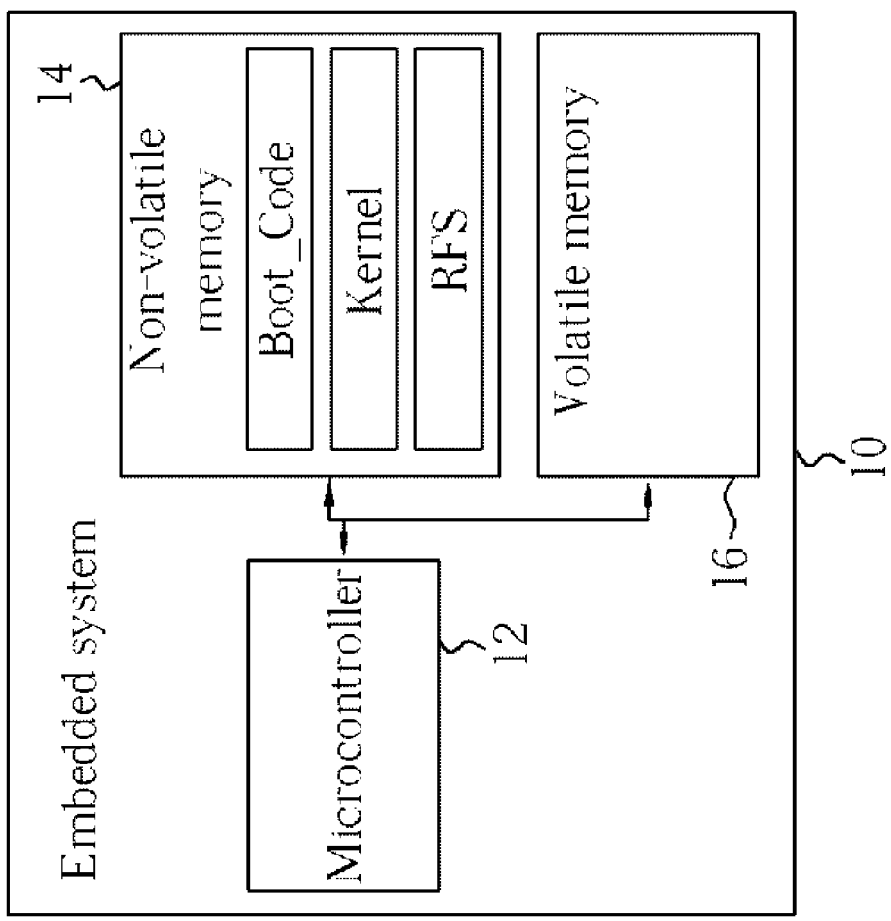
FIG. 1 is a block diagram of a related art embedded system.
Figure 2:
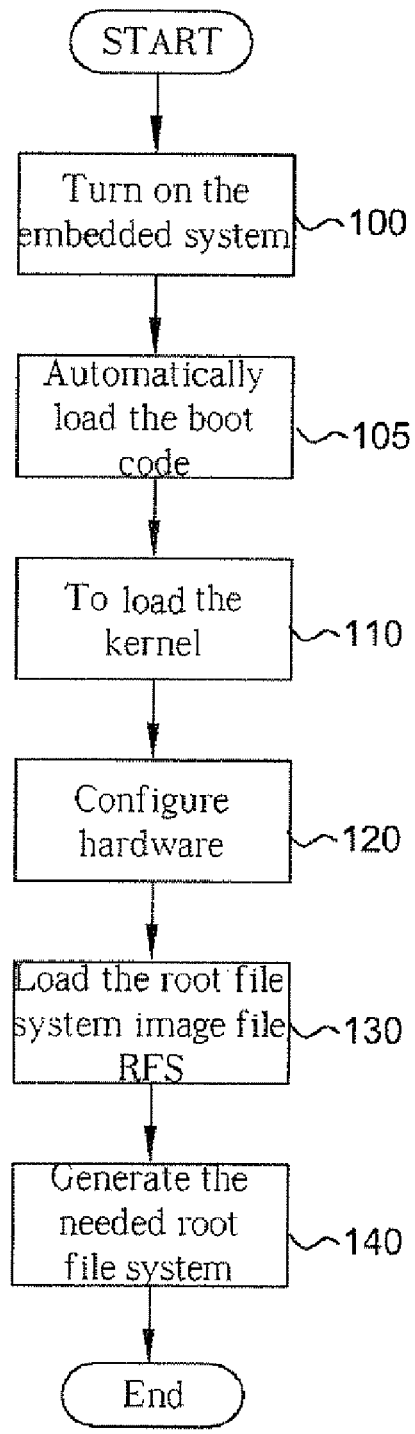
FIG. 2 shows a flowchart of loading the embedded system.
Figure 3:
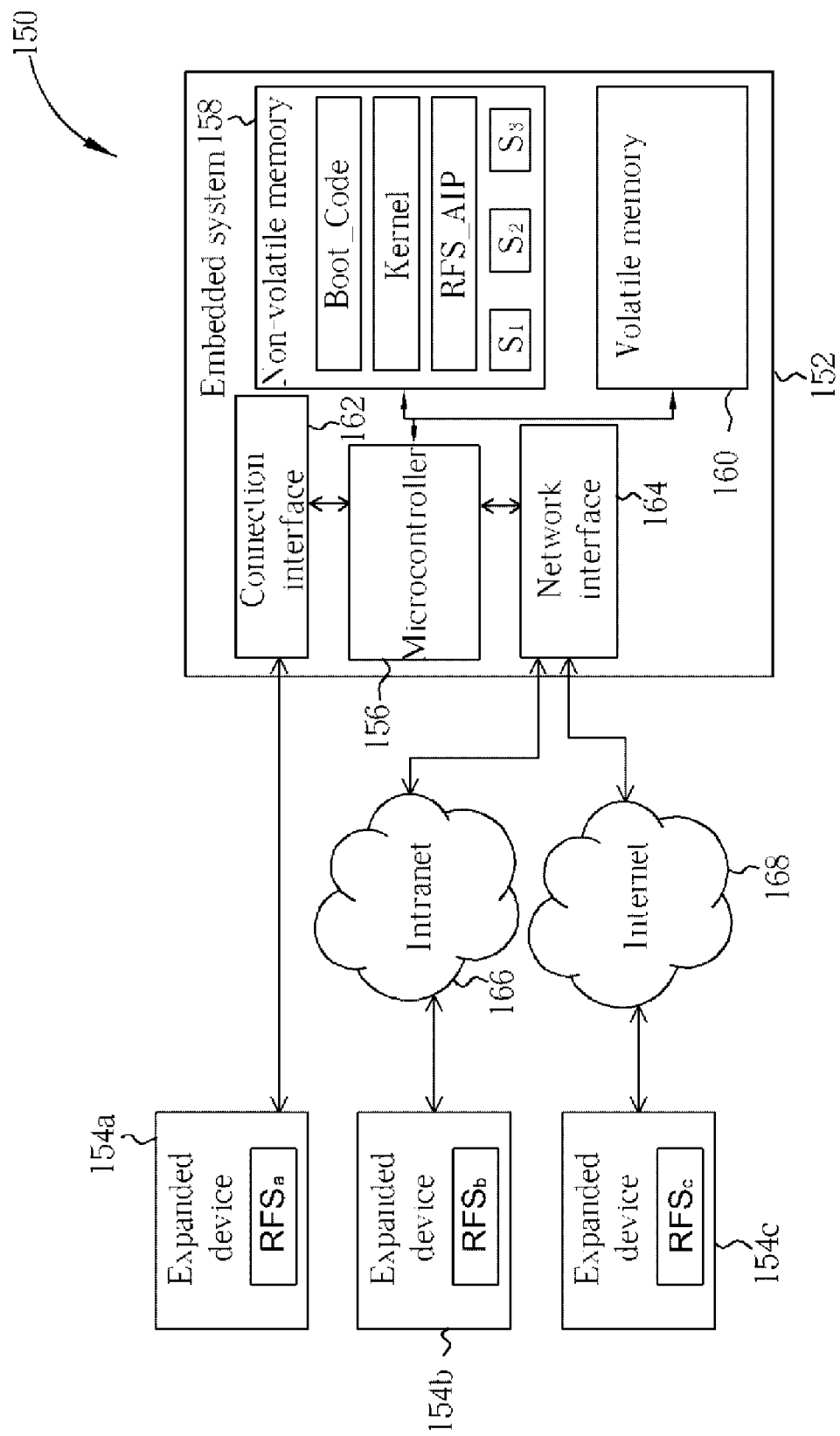
FIG. 3 is a block diagram of an automatic loading system utilized in the present invention.

Please refer to FIG. 3. FIG. 3 shows a block diagram of an automatic loading system 150 utilized in the present invention. The automatic loading system 150 comprises an embedded system 152 and a plurality of external devices 154a, 154b, and 154c. In this embodiment, the embedded system 152 comprises a microprocessor 156, a non-volatile memory 158, a volatile memory 160, a connection interface 162, and a network interface 164. Additionally, the non-volatile memory 158, such as Flash memory or ROM, records a boot code Boot_Code a kernel Kernel, a root file system auto initial program RFS_AIP, and a plurality of predetermined external device configuration files $S_1$, $S_2$, and $S_3$ corresponding respectively to the external devices 154a, 154b, and 154c. As shown in FIG. 3, the external device 154a directly couples to the embedded system 152 through the connection interface 162, such as USB interface, of the embedded system 152. The external devices 154b and 154c couple to the network interface (such as network card) of the embedded system 152 through Intranet 166 and Internet 168 respectively. Additionally, the external devices 154a, 154b, and 154c (such as HDD, FDD, or CDROM) respectively store the root file system image files $RFS_a$, $RFS_b$, and $RFS_c$. Please note that the elements of the same name in the embedded system 152 of FIG. 3 and the embedded system 10 of FIG. 1 have the same functionality and operation. Further description is omitted for the sake of brevity.

Figure 4:
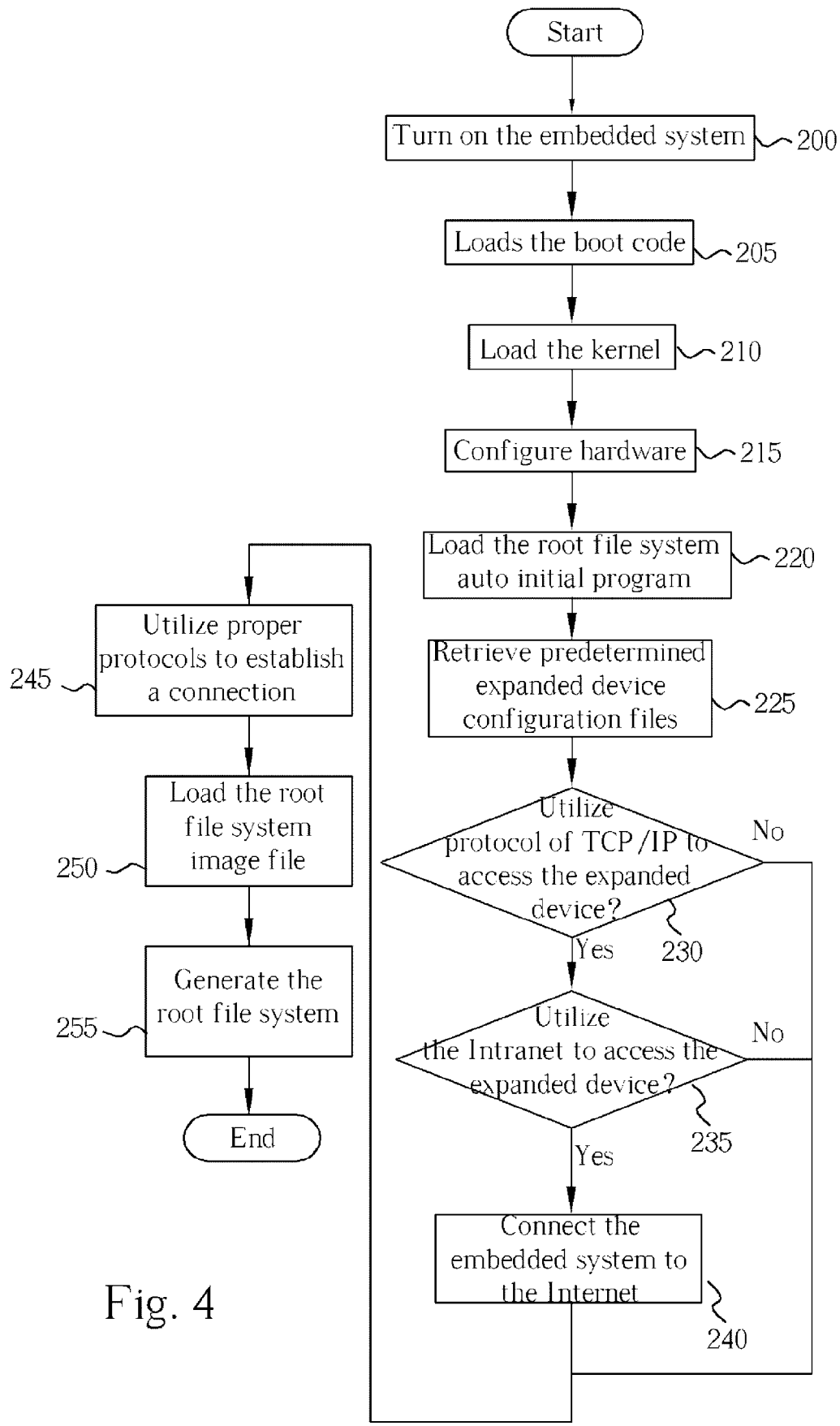
FIG. 4 is a flowchart of the automatic loading system in FIG. 3 loading the root file system.

Please refer to FIG. 3 and FIG. 4. FIG. 4 shows a flowchart of the automatic loading system 150 in FIG. 3 loading the root file system. The flowchart includes the following steps:

Step 200: Turn on the embedded system 152.
Step 205: The microprocessor 156 automatically loads the boot code Boot_Code stored in the non-volatile memory 158 to the volatile memory 160.
Step 210: The microprocessor 156 retrieves the boot code Boot_Code stored in the volatile memory 160 to execute the boot code Boot_Code to load the kernel stored in the non-volatile memory 158 into the volatile memory 160.
Step 215: The microprocessor 156 retrieves the kernel temporarily stored in the volatile memory 160 to execute the kernel to configure hardware of the embedded system 152.
Step 220: After the kernel finishes configuring the hardware of the embedded system 152, the microprocessor 156 executes the kernel to load the root file system auto initial program RFS_AIP stored in the non-volatile memory 158 to the volatile memory 160.
Step 225: The microprocessor 156 retrieves the root file system auto initial program RFS_AIP stored in the volatile memory 160 to execute the root file system auto initial program RFS_AIP to retrieve a predetermined expanded external device configuration file $S_1$, $S_2$, or $S_3$.
Step 230: Does the embedded system 152 need to utilize protocol of TCP/IP to access the external device corresponding to the predetermined external device configuration file?. If yes, execute step 235; otherwise execute step 245.
Step 235: Does the embedded system 152 need to utilize the Intranet 166 to access the external device corresponding to the predetermined external device. configuration file?. If yes, execute step 240; otherwise execute step 245.
Step 240: The microprocessor 156 executes the root file system auto initial program RFS_AIP to connect the embedded system 152 to the Internet 168 through the dynamic host configuration protocol (DHCP).
Step 245: The microprocessor 156 executes the root file system auto initial program RFS_AIP to utilize proper protocols to establish a connection between the embedded system 152 and the external device corresponding to the predetermined external device configuration file.
Step 250: The microprocessor 156 executes the root file system auto initial program RFS_AIP to load the root file system image file recorded in the external device into the volatile memory 160 according to the predetermined external device configuration file.
Step 255: The microprocessor 156 decompresses the root file system image file to generate the needed root file system.

The operation of the steps 200.about.215 is the same as the steps 100.about.120 therefore any further discussion is omitted for the sake of brevity. In this embodiment, there is a key difference from the prior art loading mechanism of a root file system that the embedded system 152 includes a root file system auto initial program RFS_AIP for controlling the loading operation of the root file system, wherein the root file system auto initial program RFS_AIP is not the application software of the root file system. After the kernel finishes configuring the embedded systemt's 152 hardware, the microprocessor 156 executes the kernel to load into the volatile memory 160 the root file system auto initial program RFS_AIP (step 220). Next, the microprocessor 156 starts executing the root file system auto initial program RFS_AIP to control the next loading operation. In this embodiment, a user can provide some parameters to the root file system auto initial program RFS_AIP for controlling the root file system auto initial program RFS_AIP to retrieve a predetermined external device configuration file $S_1$, $S_2$, or $S_3$ (step 225). For example, the root file system image files $RFS_a$, $RFS_b$, and $RFS_c$ correspond to Chinese, English, and Japanese respectively. To utilize the embedded system 152 supporting Chinese, the user can provide parameters to the root file system auto initial program RFS_AIP to control the root file system auto initial program RFS_AIP to retrieve the predetermined external device configuration file $S_1$.

As to the predetermined external device configuration file $S_1$, the predetermined external device configuration file $S_1$ comprises a path name corresponding to a storage address of the root file system image file $RFS_a$, and a Metadata utilized to configure The access method of the expanded external device $154_a$. The Metadata of the predetermined external device configuration file $S_1$ is a direct external instruction for pointing embedded system 152 not utilizing the network (Intranet 166 and Internet 168) to access The root file system image file $RFS_a$ of the external device $154_a$. The microprocessor 156 executes the root file system auto initial program RFS_AIP to utilize proper protocols (e.g. USB transmission protocol) to establish a connection between the embedded system 152 and the external device 154a (step 245). The root file system auto initial program RFS_AIP loads the root file system image file $RFS_a$ into the volatile memory 160 according to the path name of the predetermined external device configuration file $S_1$ (step 250). Finally, the microprocessor 156 decompresses and loads to the root file system image file $RFS_a$ in the volatile memory 160 to generate the needed root file system supporting Chinese.

Additionally, if the user wants to utilize the embedded system 152 supporting English, the user can give parameter to the root file system auto initial program RFS_AIP to control the root file system auto initial program RFS_AIP to retrieve another predetermined external device configuration file $S_2$. Typically, the predetermined external device configuration file $S_2$ comprises a path name corresponding to a storage address of the root file system image file $RFS_b$, and a Metadata utilized to configure the access method of the external device $154_b$. The Metadata of the predetermined external device configuration file $S_2$ is a TCP/IP connection instruction for pointing out that the embedded system 152 utilizes the Intranet 166 to access the root file system image file $RFS_b$ of the external device $154_a$ (steps 230 and 235). Thus, the microprocessor 156 executes the root file system auto initial program RFS_AIP to utilizes proper protocols, for example, Trivial File Transfer Protocol (tftp), File Transfer Protocol (ftp), Hypertext Transmission Protocol (HTTP), Network File System (NFS) or Server Message Block (SMB), to establish a connection between the embedded system 152 and the external device $154_b$ (step 245). Then, the root file system auto initial program RFS_AIP loads the needed root file system image file $RFS_b$ to the volatile memory 160 according to the path name recorded in the predetermined external device configuration file $S_2$ (step250). Finally, the microprocessor 156 decompresses and loads into the root file system image file $RFS_b$ in the volatile memory 160 to generate the needed root file system supporting English.

Furthermore, if the user wants to utilize the embedded system 152 supporting Japanese, the user can give parameter to the root file system auto initial program RFS_AIP to control the root file system auto initial program RFS_AIP to retrieve another predetermined external device configuration file $S_3$. In the present embodiment, the predetermined external device configuration file $S_3$ comprises a path name corresponding to a storage address of the root file system image file $RFS_c$, and a Metadata utilized to configure the access method of the external device $154_c$. The Metadata of the predetermined external device configuration file $S_3$ is a TCP/IP connection instruction for pointing the embedded system 152 utilizing the Internet 168 to access the root file system image file $RFS_c$ of the external device $154_c$ (steps 230). In order to connect the embedded system 152 to the Internet 168, the microprocessor 156 executes the root file system auto initial program RFS_AIP to utilize a protocol of dynamic host configuration protocol (DHCP) to configure network connection information of the embedded system 152, for example, an IP address (step240). The microprocessor 156 executes the root file system auto initial program RFS_AIP to utilizes proper protocols, for example, Trivial File Transfer Protocol (tftp), File Transfer Protocol (ftp), Hypertext Transmission Protocol (HTTP), Network File System (NFS) or Server Message Block (SMB), to establish a connection between the embedded system 152 and the external device $154_c$ (step245). Then the root file system auto initial program RFS_AIP loads the needed root file system image file $RFS_c$ to the volatile memory 160 according to the path name recorded in the predetermined external device configuration file $S_3$ (step250). Finally, the microprocessor 156 decompresses and loads into the root file system image file $RFS_c$ in the volatile memory 160 to generate the needed root file system supporting Japanese.

Please note that the present invention does not limit the number of the external device though only three external devices $154_a$, $154_b$, and $154_c$ are shown in FIG. 3. Additionally, since the predetermined external device configuration file comprises the path name to indicate the storage address of the root file system image file, the present invention does not limit that the external device can only store a root file system image file. In other words, if the same specific external device records a plurality of different root file system image file, the present invention can also read a needed root file system image file from the plurality of root file system image files through a specific path name of a predetermined external device configuration file. The above variations are in the range of the present invention.

Compared to the related art, the present invention utilizes an external device to provide a larger volume to store the root file system image file. Therefore, if the volume of the volatile memory is enough and can execute the root file system image file, the volume of root file system image file does not limit to the volume of the non-volatile memory. Therefore the root file system image file can be optimized and comprises more application programs to make diversity of the embedded system. Additionally, the present invention can load the root file system image file from outside to make the embedded system to execute the needed root file system, and then raise the flexibility of utilizing embedded system. Additionally, the present invention loads the root file system auto initial program before application programs loading to control the booting process, and the present invention loading root file system image file can easily be applied to various kinds of embedded systems. In other words, the present invention loading root file system image file is easily to be implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method capable of automatically loading a root file system to an embedded unit of an embedded system comprising a plurality of devices external to the embedded unit, the method comprising:
   (a) turning on the embedded unit to execute a boot code;
   (b) utilizing the boot code to execute a kernel;
   (c) choosing one of a plurality of external device configuration files stored on a storage device of the embedded unit based on a requirement of a user, wherein the plurality of external device configuration files correspond to the plurality of devices external to the embedded unit, respectively;

(d) determining a connection protocol for accessing one of a plurality of root file system image files, based on the chosen one of a plurality of external device configuration files, wherein the plurality of root file system image files are stored in the plurality of devices external to the embedded unit, respectively, wherein at least one of the plurality of external devices is connected to the embedded unit directly and at least one of the plurality of external devices is connected to the embedded unit through a network interface, and thus the connection protocol can be a direct connection protocol, an internet protocol, or an intranet protocol;

(e) through the determined connection protocol, utilizing the kernel to execute a root file system auto initial program to access and retrieve the one of the plurality of root file system image files based on the chosen one of the plurality of external device configuration files; and (f) loading the root file system into the embedded unit according to the one of the plurality of root file system image file.

2. The method of claim 1, wherein the each of the plurality of external device configuration files comprises:
a path name for corresponding to a storage address of a root file system image file; and
a Metadata for configuring an access method of a device external to the embedded unit.

3. The method of claim 2, wherein the Metadata is a direct external instruction, and therefore the connection protocol is a direct connection protocol.

4. The method of claim 2, wherein the Metadata is a TCP/IP connection instruction, and therefore the connection protocol is a network protocol.

5. The method of claim 4, wherein the network connection protocol is Trivial File Transfer Protocol (tftp), File Transfer Protocol (ftp), Hypertext Transmission Protocol (HTTP), Network File System (NFS), and Server Message Block (SMB).

6. The method of claim 4, wherein the connection protocol is dynamic host configuration protocol (DHCP).

7. The method of claim 1, wherein the connection protocol is USB transmission. protocol.

8. An embedded system comprising:
an embedded unit; and
a plurality of devices external to the embedded unit;
wherein the embedded unit comprising:
a microprocessor for controlling an operation of the embedded system;
a first storage device coupled to the microprocessor; and
a second storage device coupled to the microprocessor for storing a boot code, a kernel, a root file system auto initial program, and a plurality of external device configuration files;
wherein the plurality of external device configuration files correspond to the plurality of devices external to the embedded unit, respectively;
wherein a plurality of file system files are stored in the plurality of devices external to the embedded unit respectively, the microprocessor determines a connection protocol for accessing one of the plurality of system image files based on one of the plurality of external device configuration files chosen by a user, wherein at least one of the plurality of devices external to the embedded unit is connected to the embedded unit directly through a direct connection interface and at least one of the plurality of devices external to the embedded unit is connected to the embedded unit through a network interface, and thus the connection protocol can be a direct connection protocol, an internet protocol, or an intranet protocol;

wherein the microprocessor sequentially loads and executes the boot code, the kernel and the root file system auto initial program from the second storage device, utilizes the kernel to load the root file system auto initial program to retrieve the one of a plurality of file system image files stored in the one of a plurality of devices external to the embedded unit, and loads a root file system into the first storage device according to the one of a plurality of root file system image files.

9. The embedded system of claim 8, wherein each of the plurality of external device configuration files comprises:
a path name for corresponding to a storage address of a root file system image file; and
a Metadata for configuring an access method of a device external to the embedded unit.

10. The embedded system of claim 9, wherein the Metadata is a direct external instruction, and therefore the connection protocol is a direct connection protocol.

11. The embedded system of claim 9, wherein the Metadata is a TCP/IP connection instruction, and therefore the connection protocol is a network protocol.

12. The embedded system of claim 11, wherein the network protocol is Trivial File Transfer Protocol (tftp), File Transfer Protocol (ftp), Hypertext Transmission Protocol (HTTP), Network File System (NFS), or Server Message Block (SMB) to access the root file system image file stored in the expanded device through the network.

13. The embedded system of claim 11, wherein the network protocol is dynamic host configuration protocol (DHCP).

14. The embedded system of claim 8, wherein the first storage device is a volatile memory and the second storage device is a non-volatile memory.

15. The system of claim 8, wherein the connection protocol is USB transmission protocol.

16. An automatic loading system of a root file system comprising:
an embedded unit; and
a plurality of devices external to the embedded unit;
wherein the embedded unit comprising:
a microprocessor for controlling an operation of the embedded system;
a first storage device coupled to the microprocessor; and
a second storage device coupled to the microprocessor for storing a boot code, a kernel, and a root file system auto initial program, and a plurality of external device configuration files;
wherein the plurality of external device configuration files correspond to the plurality of devices external to the embedded unit, respectively;
wherein a plurality of file system files are stored in the plurality of devices external to the embedded unit, respectively, the microprocessor determines a connection protocol for accessing one of the plurality of system files based on one of the plurality of external device configuration files chosen by a user, wherein at least one of the plurality of devices external to the embedded unit is connected to the embedded unit directly through a direct connection interface and at least one of the plurality of devices external to the embedded unit is connected to the embedded unit through a network interface, and thus the connection protocol can be a direct connection protocol an internet protocol, or an intranet protocol;

wherein the microprocessor sequentially loads and executes the boot code, the kernel and the root file system auto initial program from the second storage device, utilizes the kernel to load the root file system auto initial program to retrieve the one of the plurality of file system image files stored in the one of the plurality of devices external to the embedded unit, and loads the root file system into the first storage device according to the one of the plurality of root file system image files.

17. The system of claim 16, wherein the connection protocol is Trivial File Transfer Protocol (tftp), File Transfer Protocol (ftp), Hypertext Transmission Protocol (HTTP), Network File System (NFS), or Server Message Block (SMB).

18. The system of claim 16, wherein the connection protocol is USB transmission protocol.

* * * * *